US008662899B1

(12) United States Patent
Alayoub

(10) Patent No.: US 8,662,899 B1
(45) Date of Patent: Mar. 4, 2014

(54) COOPERATIVE TRAINING DEVICE

(71) Applicant: Ayoub Khaled Alayoub, Mishrif (KW)

(72) Inventor: Ayoub Khaled Alayoub, Mishrif (KW)

( * ) Notice: Subject to any disclaimer, the term of this patent is extended or adjusted under 35 U.S.C. 154(b) by 0 days.

(21) Appl. No.: 13/894,387

(22) Filed: May 14, 2013

(51) Int. Cl.
*G09B 19/00* (2006.01)

(52) U.S. Cl.
USPC .......................................... 434/236

(58) Field of Classification Search
USPC ............ 434/236, 237, 247, 255, 258; 482/51, 482/54, 66, 70
See application file for complete search history.

(56) References Cited

U.S. PATENT DOCUMENTS

| | | | | |
|---|---|---|---|---|
| 2,160,722 | A * | 5/1939 | Cunningham | 482/79 |
| 2,538,838 | A * | 1/1951 | Kuhnen | 482/51 |
| 2,984,497 | A * | 5/1961 | Hagen | 280/619 |
| 3,049,350 | A * | 8/1962 | Walker | 472/15 |
| 3,933,353 | A | 1/1976 | Marsh | |
| 5,762,503 | A * | 6/1998 | Hoo et al. | 434/237 |
| 6,079,984 | A * | 6/2000 | Torres et al. | 434/247 |
| 6,254,101 | B1 | 7/2001 | Young | |
| 6,378,871 | B1 | 4/2002 | Roberts | |
| 6,599,128 | B2 * | 7/2003 | Roberts | 434/128 |
| 7,288,049 | B2 * | 10/2007 | Stebler, Jr. | 482/70 |
| 7,326,152 | B2 * | 2/2008 | Gates | 482/66 |
| 8,475,342 | B2 * | 7/2013 | Flowers et al. | 482/69 |
| 2003/0220160 | A1 | 11/2003 | Clark et al. | |
| 2007/0049468 | A1 | 3/2007 | Stebler, Jr. | |

* cited by examiner

*Primary Examiner* — Kurt Fernstrom
(74) *Attorney, Agent, or Firm* — Richard C. Litman

(57) ABSTRACT

The cooperative training device is used for teaching cooperation, teamwork and communication for a group of participants. The training device is an annular, flexible mat having radially extending pairs of foot straps spaced apart on the upper surface of the mat and a corresponding tether extending from the outer foot strap of each pair. Teams of participants are trained to cooperate by instructing the team to move the mat from one location to another while standing in the foot straps and grasping the tether. The mat may have true and false directional indicia marked thereon, may be divided into quadrants, and may have designated penalty areas where non-cooperating team members are directed to go and remain stationary.

18 Claims, 6 Drawing Sheets

COOPERATIVE TRAINING DEVICE

BACKGROUND OF THE INVENTION

1. Field of the Invention

The present invention relates to training devices and methods, and particularly to a cooperative training tool and method for teaching cooperation, teamwork and communication between users.

2. Description of the Related Art

Any great organization knows that the foundation of any successful team is trust, communication, cooperation and leadership. In any group, whether for business, sports or leisure, teamwork is the key. Teamwork leads a football team to victory. Also, teamwork helps a business attain success over competitors. Bottom-line results of companies today are increasingly connected to how well employees communicate, collaborate and work together to achieve shared goals. Teamwork is the collective work done by a group towards a certain goal. It is important in attaining all the aims of an organization or a group. No matter what kind of a group you belong to, working together is vital in order to get an efficient output. Moreover, for business organizations, it also helps employees finish tasks at a faster rate. The upward trend is that employees of all types are increasingly working in teams. Therefore, in order to accomplish the goal of building better workplace teams of employees, team-building exercises that teach cooperation, teamwork and communication are vital and necessary to building this strong foundation.

In making and improving teamwork within an organization, corporate training, such as team-building exercises, is important. This will not only promote the culture of teamwork, but it will also help in teaching every member of your group about the value of working together, communicating effectively and cooperating together to benefit each and every employee as well as the entire organization. Team-building exercises build trust among participants and develop listening skills. Team-building exercises improve the ways employees coordinate, collaborate and communicate. Team-building exercises can directly impact overall productivity and profitability. Lasting improvements in areas connected to listening, communicating clearly (and non-defensively), collaborating effectively and managing moods and emotions can be achieved through this type of corporate training. The exercises can range from simple, moderate or difficult. The difficulty level is determined based on the number of tasks assigned to the participants, as well as how much participants partake in the exercises. These group exercises demonstrate the necessity for other teammates to complete the activity together as a whole, thereby instilling unity and growth-development amongst the group. In many exercises, certified facilitators are trained to execute exercises, insuring that participants are learning as they work through the assigned tasks.

Thus, a cooperative training device solving the aforementioned problems is desired.

SUMMARY OF THE INVENTION

The cooperative training device is used for teaching cooperation, teamwork and communication to a group of participants. The training device is a round, flexible mat having a hole in the middle and a multitude of tethers extending from the top surface of the mat for participants to grasp as they stand on top of the mat during the training exercises. Participants place their feet in foot straps that are secured on the top surface of the mat. This enables the participants to stay more securely attached to the mat as they complete the aforementioned training exercises. The mat has indicia defining four distinct quadrants on the flexible mat, in addition to reference markers, in order to provide communication means for the participants to point out to one another and reference during the training exercise. During training, participants are expected, in one unified motion, to move the flexible mat forward with themselves securely attached to the top surface of the mat through the use of the tethers and foot straps at the noted reference markers.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
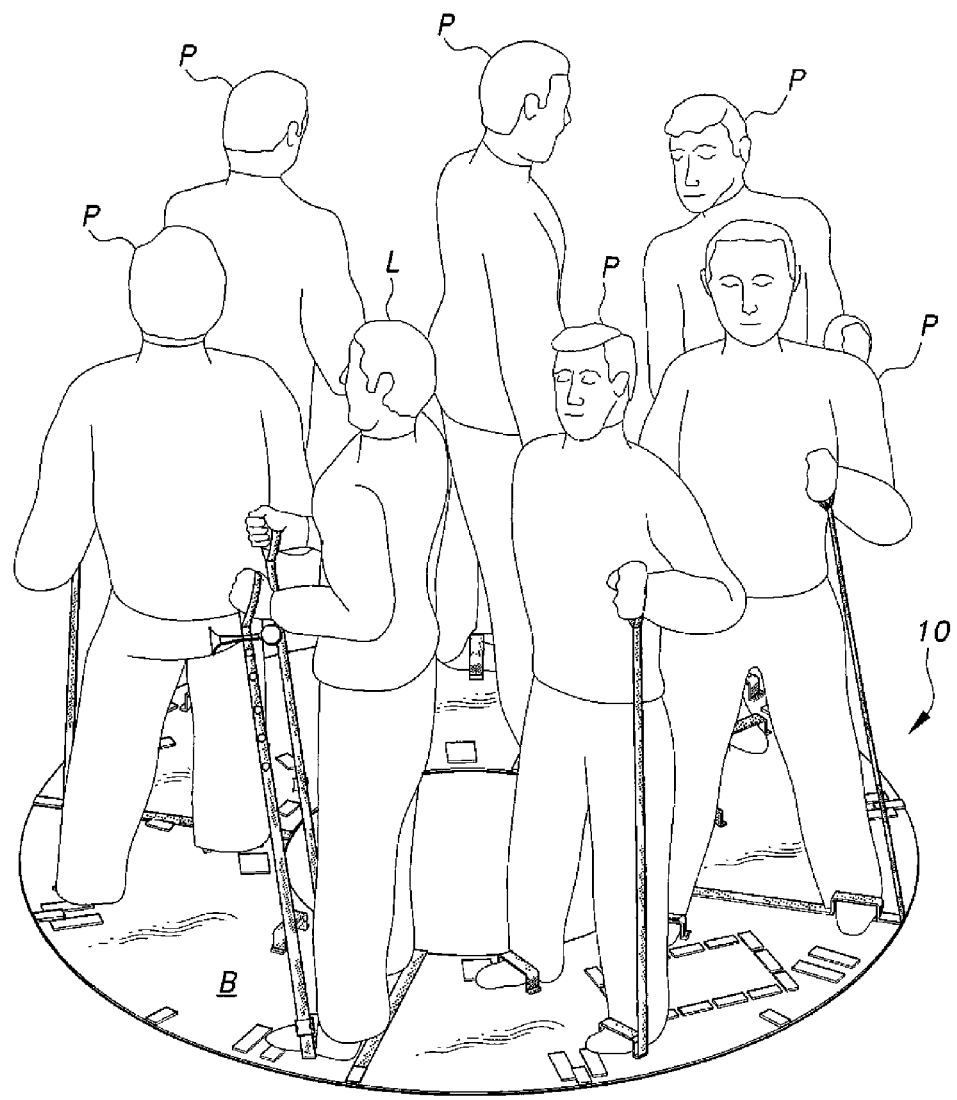
FIG. 1 is an environmental perspective view of a cooperative training device according to the present invention.

As best shown in FIG. 1, the cooperative training device 10 is an annular, flexible mat 12 having a central hole defining an outside edge 14 and an inside edge 16. The upper surface 17 of the mat 12 extends between the outside and inside edges 14, 16. A multitude of cords extend from the upper surface 17 of the mat 12 for users to grasp as they stand on top of the mat 12 during the training exercises. There are two different types of cords, or tethers 30, 40. Each of the tethers 30, 40 have a fixed end and a free end. The fixed ends are securely attached to the upper surface 17 of the mat 12, whereas the free ends are capable of being held by the users as they stand upright on the mat 12. For the single leader L of the group, there are two leader tethers 30 having wrist loops 32 and foot straps 31. The leader tethers 30 are denoted by the colors black and gray. For the participants P, using the colors blue and gray, there are eight participant tethers 40 having corresponding wrist loops 42 and foot straps 41. Some of the tethers 30, 40 are detachable by quick disconnect buckles 36. Additionally, users may place their opposite feet in the plethora of foot straps 34, 44, for the leader L and participants P, respectively, which are affixed on both ends to the upper surface 17 of the mat 12. This enables the users to stay more securely attached to the mat 12 as they complete the aforementioned training exercises.

Figure 2:
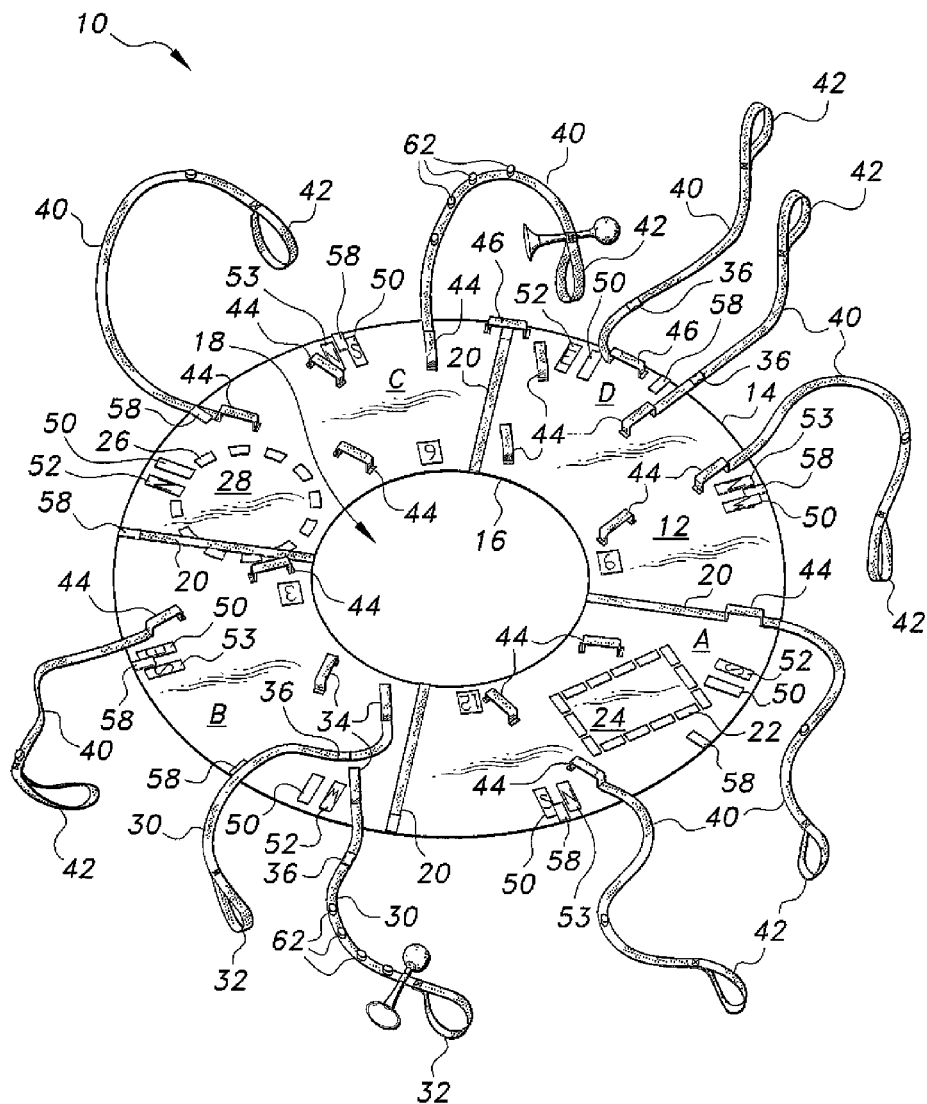
FIG. 2 is a perspective view of a cooperative training device according to the present invention.
Figure 3A:
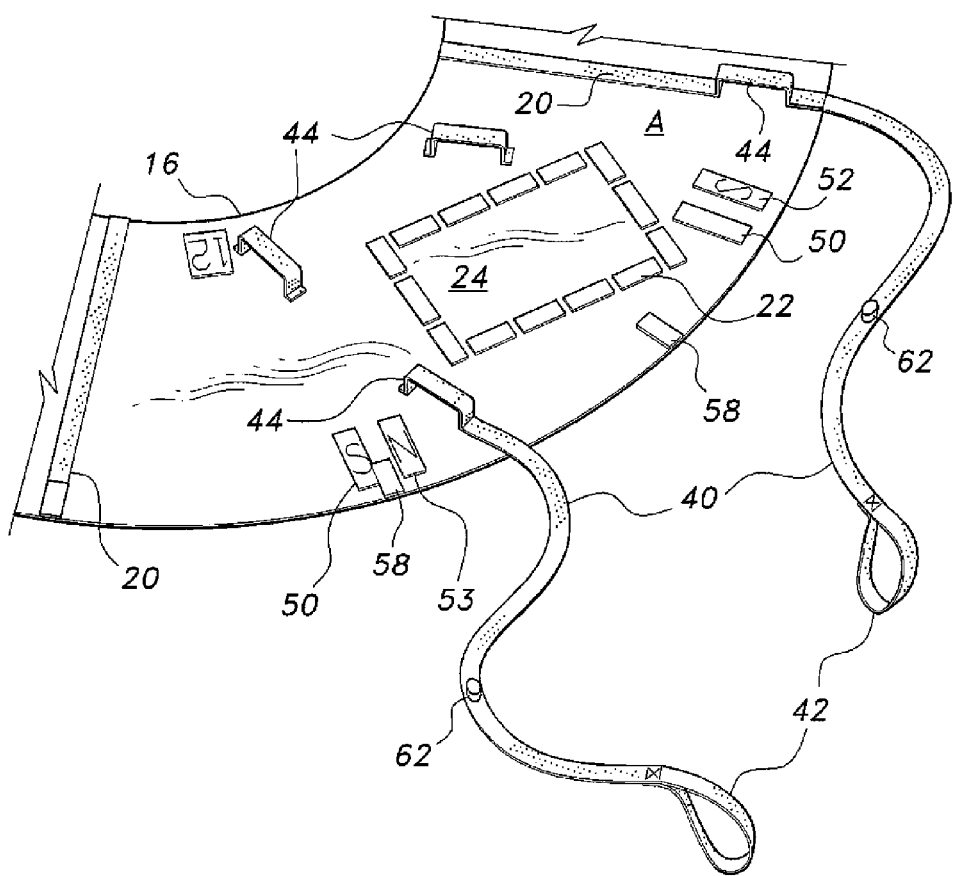
FIG. 3A is an enlarged partial perspective view of the training device of FIG. 2, showing a first quadrant of the mat.
Figure 3B:
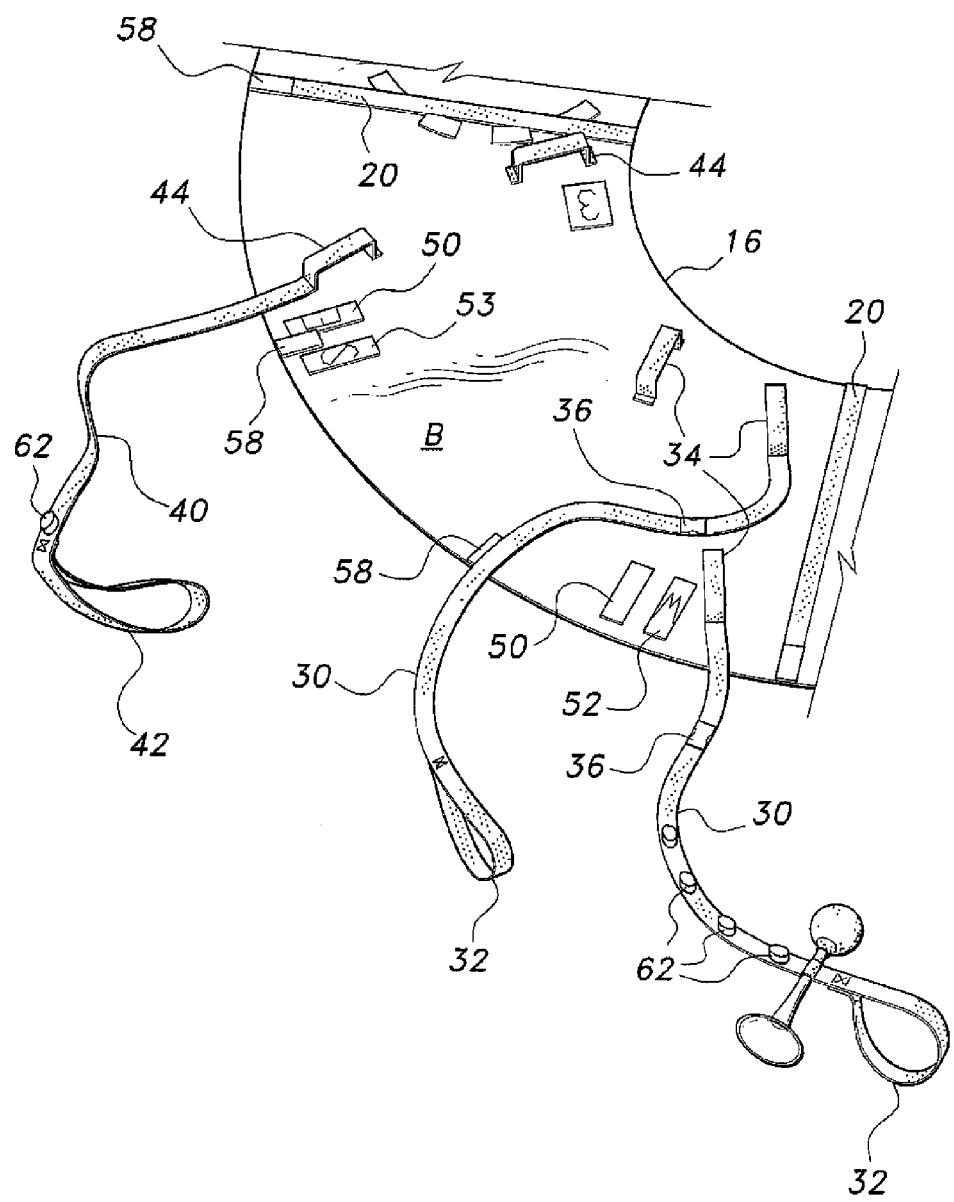
FIG. 3B is an enlarged partial perspective view of the training device of FIG. 2, showing a second quadrant of the mat.
Figure 3C:
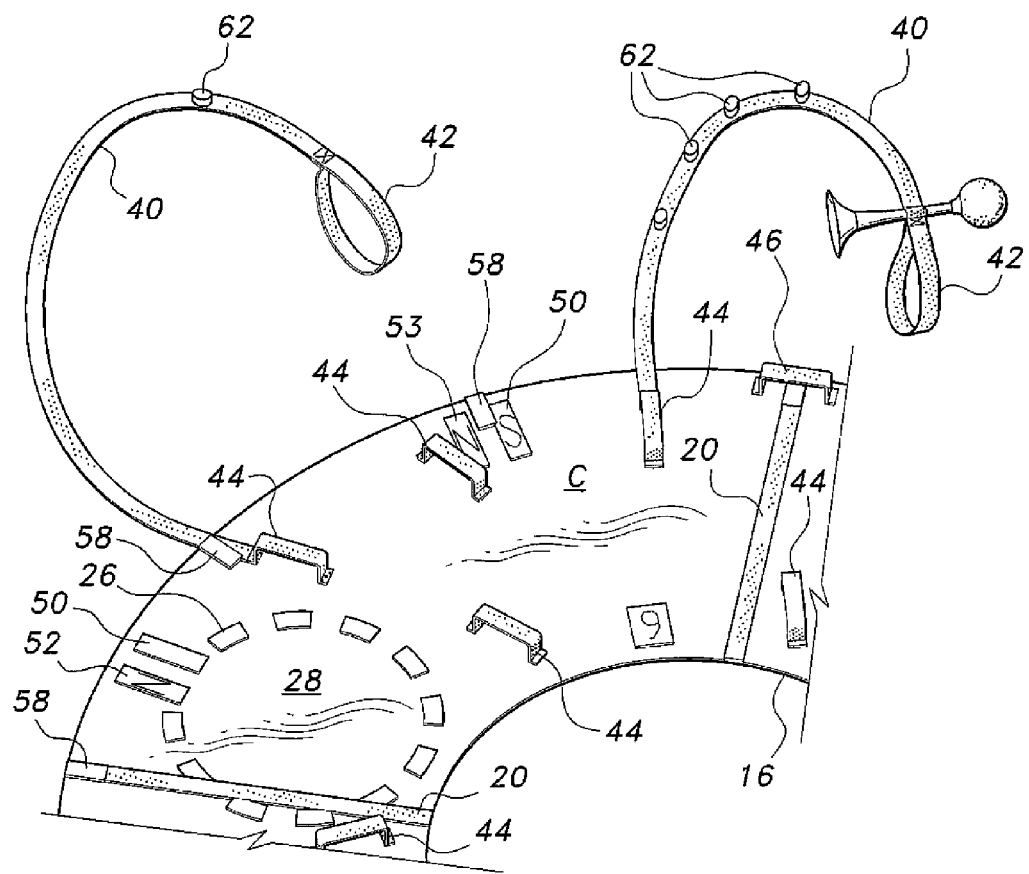
FIG. 3C is an enlarged partial perspective view of the training device of FIG. 2, showing a third quadrant of the mat.
Figure 3D:
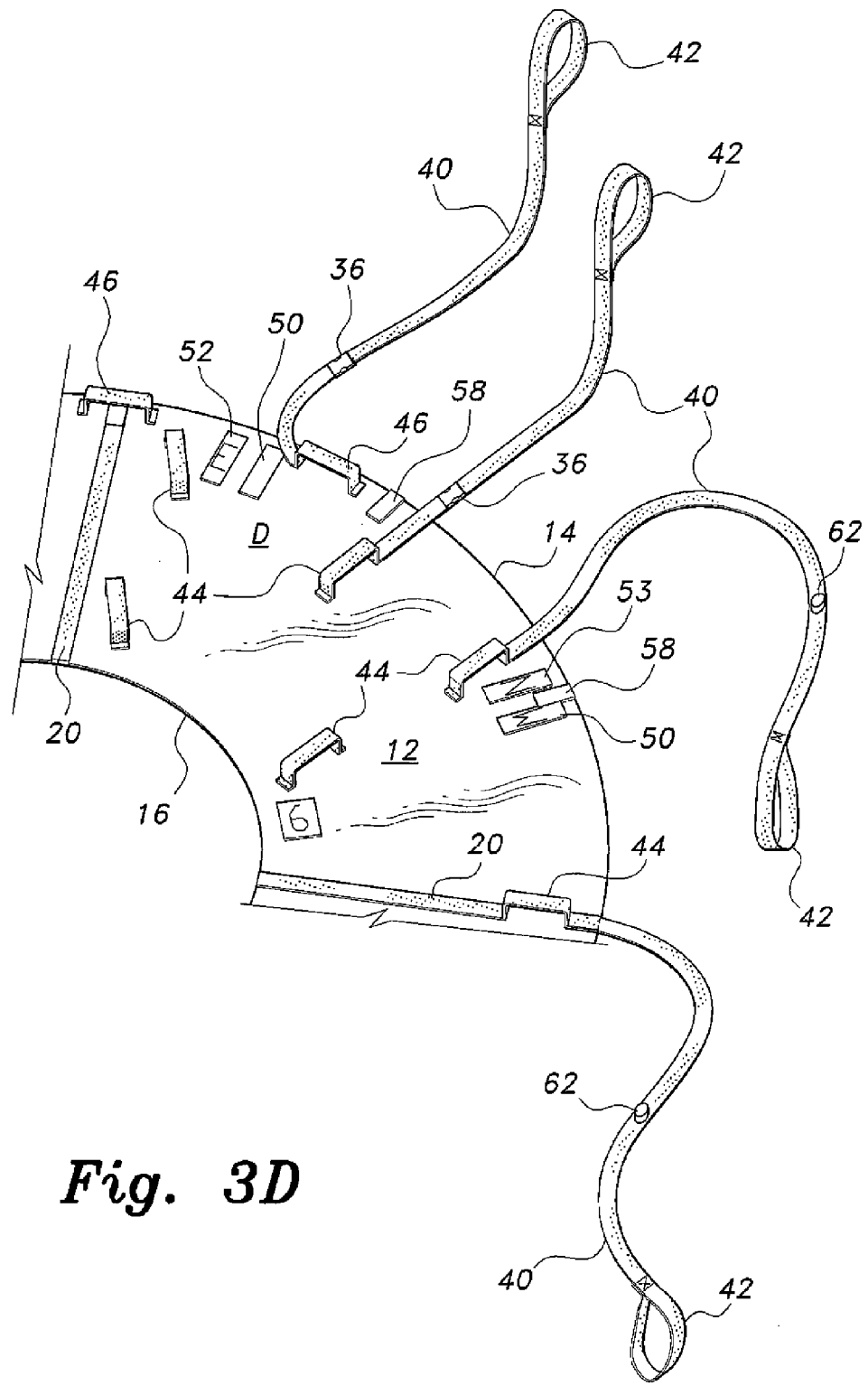
FIG. 3D is an enlarged partial perspective view of the training device of FIG. 2, showing a fourth quadrant of the mat.

The mat 12 is made from a layer of material that is waterproof and durable, so that the mat 12 does not tear or become damaged when placed on the ground. The layer is composed of latex, rubber (e.g. nitrile or silicone rubber), styrenic elastomers, polyurethane, PVC, Gore-Tex®, Elvaloy®, Hypalon®, Dartex®, Permalon®, or any combination thereof. In order to strengthen the mat 12 for use during the team-building exercises, a plurality of strengthening ribs 20 are integrated into the mat 12 during manufacture and are equally spaced apart such that the ribs 20 create four distinct quadrants A, B, C, D on the upper surface 17, as diagrammatically illustrated in FIG. 2. The ribs 20 may be color-coded, forming indicia clearly dividing the mat 12 into quadrants. There may be connecting straps 46 between quadrants C, D to enhance the strength of the mat 12, as shown in FIG. 3C.

A variety of different communication tools are provided to the users, such as lights 62 and horns 38. These tools attach to the tethers 30, 40 by clips and come in a rainbow of colors. A positive way for the leader L to communicate to participants P that they are working well together on the team-building exercises is to award reward stars 64, which represent crowns.

The mat 12 has different reference point markers with distinct colors and characters permanently affixed to the surface 17. Each of quadrants A, B, C, D is shown in FIGS. 3A-3D, each having their corresponding reference point markers in each of their specific locations. Orange numeric characters 48 are used to reflect a clock system of the type that Air Force pilots use to scan the envelope around an aircraft (12 o'clock is straight ahead and 6 o'clock is directly astern). Blue numeric characters 50 are randomly placed on the mat 12 to be used as locations that users can refer to during the team-building exercises. The mat 12 has some alpha characters 52 that are placed to show true compass locations of north (N), south (S), east (E), and west (W), and other alpha characters 53, such as north-south (NS), that are either directions that do not exist, or that are marked incorrectly, thereby comprising "deception points" in order to provide conflict for team members to work through together. Single white alpha characters 54 are letters placed on the surface 17 with no clear meaning, unless otherwise defined by team members. White numeric characters 56 are used for marking each location of the foot straps 34, 44, as well as other random locations on the mat 12 with no clear order. Additionally, white markers 58 and directional arrows 60 are interspersed randomly throughout the device 10 with no clear meaning and utility. As mentioned above, while the team members are working through the team-building exercises, they may allocate these reference point markers for specific purposes during the exercises.

There are varieties of different training exercises that the device 10 may be used for. It has been designed for use with three to ten users, as well as one facilitator who does not participate directly in the exercises. While nine team members are ideal, at least two users are expected to be participants P, while the third is elected by the team to be the leader L. In some exercises, the facilitator may feel the need to select the team leader L. For all exercises, all users grasp the wrist loops 32, 42 of the tethers 30, 40 and stand on the surface 17. The leader L will slip his feet into the foot straps 31, 34, while the participants P do the same with foot straps 41, 44.

It is vitally important that each and every team member participate during the team-building exercises. When a leader L feels that a team member has done an outstanding job communicating or cooperating with the team members, the leader L may allow the participant P to enter the open gallery 18 take a break. The leader L may also reward the participant P with a reward star 64.

However, in the case where one or more team members chose not to participate or improperly follow the instructions of the facilitator, the leader L and/or the participants P may choose to punish the participant not following directions. Should punishment be necessary, the team member shall be banished to "jail." The mat 12 has two punishment areas, including a punishment gallery 24 marked off by a blue border 22 in quadrant A, and a punishment circle 28 marked off by a blue border 26 in quadrants B, C. When team members are sent to "jail," they are required to stand in the gallery 24 without holding onto any tethers 40 or utilizing any foot straps 41, 44. When in the circle 28, team members must sit without holding onto anything. The team-building exercises must go on as planned, proving how difficult it is when all team members are present, but not cooperating.

There are different team-building exercises for teams to complete with the device 10. During any or all of these exercises, the facilitator may impose a rule of non-verbal communication only, wherein no talking is permitted by any team members.

The first Team Building Exercise is entitled The Walking Exercise and has nine Team Members with no Leader. The task is to move the device 10 from one point (represents Today) to another point (represents the Future), wherein the distance between the two points is 4 meters. There a few questions that are to be asked after the task is completed. The questions may include the following. Did the participants negotiate the task amongst themselves and with the facilitator? To what extent did the team examine the device 10 before starting the task? How did the team members place themselves on the device 10? Did the team appoint a leader and in what way? What were the criteria for selecting the leader for this task? What was the method for moving? Was the method organized, by coincidence or by trial or error? There are a few expectations of what should have occurred. The team started by moving those in front and then in the back. There was an accident, such as falling down of some participants, especially when those in front tried to move forward while those in the back kept standing still. Some members participated without being convinced of the efficacy of the device 10, either in general or in the task. However, they did not express their feeling or opinions. Why? Is it because they are afraid or hesitant? Did the facilitator or the leader offer a safe environment for the participant? Had the participant any similar experience? To what extent did the participant understand the objective of this exercise and was it the same between all the members?

The second Team Building Exercise is entitled The Exchange Exercise and has nine Team Members that include a Leader appointed by Facilitator. The task is to move device 10 from one point (represents Today) to another point (represents Future), wherein the distance between the points is 4 meters. There are a few special instructions. The members select their places on the device 10. Then the members in quadrant A exchange positions with the members in quadrant C, while the members in quadrant B exchange positions with the members in quadrant D. There is a time limit to be set. There a few questions that are to be asked after the task is completed. For example, to what extent did the participants refuse or challenge exchanging positions? Did any team member ask the facilitator to cancel the exchange? What would you expect the team performance to be without the exchange? Did the team ask for a longer period to achieve the task because of the exchange? Is there any link between the exchange and the safety of the team members? Would the exchange (as an obstacle, difficulty or challenge) lead to more innovation? What was the impact of the exchange on the team communication during this exercise? There are a few expectations of what should have occurred. Most participants would accept this exercise condition, while a few of them would refuse. Those participants in quadrant C may be willing to exchange positions with those in quadrant A, but participants in quadrant A may avoid the exchange because of their lack of understanding of the task. You may expect some strange or silly suggestions, although it is very tactical. The exchange could lead to more closeness and enthusiasm.

The third Team Building Exercise is entitled The Environmental Exercise, and has nine Team Members with no Leader. The task is to move the device 10 from one point (represents Today) to another point (represents the Future), wherein the distance between the two points is 4 meters. There are a few special instructions: The facilitator asks the team to move from different locations by using different methods of movement, and then to determine which one is the most suitable for the exercise. The team may start on (1) a stage; (2) grass; (3) snow (or a skating area); (4) sand (or desert-like area); and (5) end on carpet. The facilitator may ask the team to move without using the device 10 (walking, running, etc.) or by other tools. There is a time limit to be set. A question is to be asked after the task is completed, namely, what was the most suitable environment for the exercise?

The fourth Team Building Exercise is entitled The Thinking-Outside-The-Box Exercise and has 20 Team Members with a Leader. The task is to move the device 10 from one point (represents Today) to another point (represents the Future), wherein the distance between the points is 4 meters. There are a few special instructions: There are too many people (20) on one device 12 that can only carry 9 members. The difficulty is the limited places on the surface 17. There is a time limit to be set. There a few questions that are to be asked after the task is completed. It is not necessary, nor is it a condition, for the team to move in one time. A leader should act as a bus driver who helps the team to transfer in 3 trips. The challenge here is the time, not the capacity.

It is to be understood that the present invention is not limited to the embodiments described above, but encompasses any and all embodiments within the scope of the following claims.

I claim:

1. A cooperative training device, comprising:
   a flexible, annular mat having an outside edge, an inside edge, and an upper surface extending between the outside and inside edges;
   a plurality of pairs of foot straps attached to the upper surface of the mat, each of the pairs including an inner foot strap adjacent the inner edge and an outer foot strap radially spaced from the inner foot strap adjacent the outer edge of the mat; and
   a plurality of tethers, each of the tethers having a fixed end secured to the upper surface of the mat adjacent a corresponding one of the outer foot straps and a free end, the tethers being adapted for grasping the free end by at least one user as the at least one user stands upright on the upper surface of the mat.

2. The cooperative training device as recited in claim 1, wherein each of said tethers further comprises a wrist loop at the free end.

3. The cooperative training device as recited in claim 1, wherein at least one of said tethers further comprises a clip-on light.

4. The cooperative training device as recited in claim 1, wherein at least one of said tethers further comprises a clip-on horn.

5. The cooperative training device as recited in claim 1, wherein at least one of said tethers further comprises a quick disconnect buckle.

6. The cooperative training device as recited in claim 1, further comprising a plurality of reference point markers affixed to the upper surface of said mat.

7. The cooperative training device as recited in claim 6, wherein each of said plurality of reference point markers has a distinct color.

8. The cooperative training device as recited in claim 7, wherein said reference point markers have characters selected from the group consisting of alphabetic, numeric, directional arrow, and star characters.

9. The cooperative training device as recited in claim 1, further comprising a plurality of radially extending strengthening ribs, each of the ribs being integral with said mat and equally spaced apart so that the ribs define four distinct quadrants on the upper surface of said mat.

10. The cooperative training device as recited in claim 9, further comprising:
    a substantially rectangular area marked off on the upper surface of the mat in a first one of the quadrants, defining a first punishment area; and
    a substantially circular area marked off on the upper surface of the mat overlapping two of the quadrants, defining a second punishment area.

11. A method of using a cooperative training device to teach cooperation, teamwork and communication among a team of users, comprising the steps of:
    providing a cooperative training device, the cooperative training device including:
    a flexible, annular mat having an outside edge, an inside edge, and an upper surface extending between the outside and inside edges;
    a plurality of pairs of foot straps attached to the upper surface of the mat, each of the pairs including an inner foot strap adjacent the inner edge and an outer foot strap radially spaced from the inner foot strap adjacent the outer edge of the mat; and
    a plurality of tethers, each of the tethers having a fixed end secured to the upper surface of the mat adjacent a corresponding one of the outer foot straps and a free end, the free end having a wrist strap, the tethers being adapted for grasping the wrist strap by at least one user as the at least one user stands upright on the upper surface of the mat;
    instructing, observing and monitoring the team of users inserting their feet into a pair of the foot straps and to grasp the corresponding tether by the wrist strap;
    the team of users inserting their feet into their respective pair of the foot straps and grasping their respective corresponding tether by the wrist strap as instructed;
    instructing, observing and monitoring the team of users working cooperatively to move the mat from one location to another location while standing on the mat and grasping the tethers; and
    the team of users working cooperatively as instructed to move the mat from one location to another location while standing on the mat and grasping the tethers.

12. The method of teaching cooperation, teamwork and communication as recited in claim 11, wherein the locations are separated by a distance of 4 meters.

13. The method of teaching cooperation, teamwork and communication as recited in claim 11, wherein said step of instructing the team to work cooperatively to move the mat from one location to another location further comprises instructing the team to move the mat within a fixed period of time.

14. The method of teaching cooperation, teamwork and communication as recited in claim 11, further comprising the step of assigning at least one member of the team to the position of team leader.

15. The method of teaching cooperation, teamwork and communication as recited in claim 11, wherein the mat has indicia dividing the mat into quadrants, the method further comprising the step of instructing some members of the team to exchange positions with other members of the team in different quadrants of the mat.

16. The method of teaching cooperation, teamwork and communication as recited in claim 11, further comprising the steps of:
  instructing members of the team to engage in non-verbal communication only; and
  penalizing talking by members of the team by instructing the member who talks to remain stationary in a designated area of the mat.

17. The method of teaching cooperation, teamwork and communication as recited in claim 11, wherein the team has a number of members exceeding the number of tethers extending from the mat.

18. The method of teaching cooperation, teamwork and communication as recited in claim 11, further comprising the step of penalizing a member of the team who does not cooperate in moving the mat by instructing the non-cooperative member to remain stationary in a designated area of the mat.

* * * * *